Aug. 17, 1965  R. K. MILLER  3,200,857
ARTICLE ASSEMBLY APPARATUS
Filed Nov. 7, 1961  2 Sheets-Sheet 1

INVENTOR
R. K. MILLER
BY A. J. Nugent
ATTORNEY

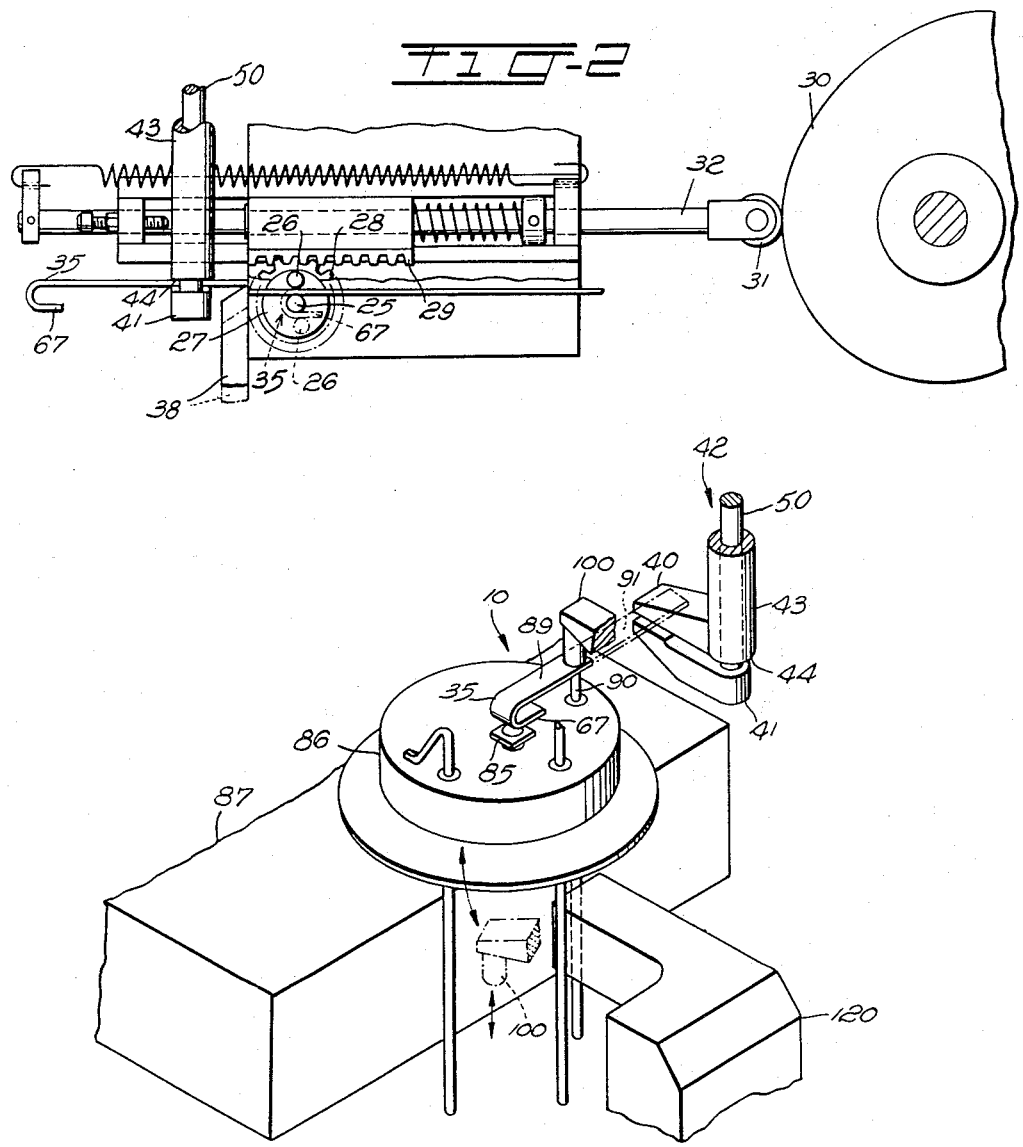

3,200,857
ARTICLE ASSEMBLY APPARATUS
Robert K. Miller, Allentown, Pa., assignor to Western Electric Company, Incorporated, New York, N.Y, a corporation of New York
Filed Nov. 7, 1961, Ser. No. 150,749
5 Claims. (Cl. 140—93)

This invention relates to an apparatus for assembling articles and particularly to an apparatus for forming and connecting a metallic conducting element, such as a J tab, to an electrode of a transistor header.

Generally, alloy transistor header assemblies comprise a Kovar body having three leads extending therethrough called the collector, emitter and base electrodes, a wafer of semiconductive material being fixed to the Kovar body. In one type of transistor, a metallic conducting element, generally of J shaped configuration, is connected to one electrode in such a manner that the long arm of the J is welded to one end of said electrode, the J bend portion being suspended directly over the semiconductive wafer.

Accordingly, the object of this invention is an apparatus for automatically forming, cutting, positioning, and welding a metallic element, such as a J tab, to a predetermined electrode of a transistor header during the fabrication thereof.

Broadly, the invention, according to the object, comprises an apparatus in which a strip of material is intermittently fed to a forming unit wherein a J bend is formed in the leading end of the strip. The strip is advanced to a positioning mechanism which receives and secures the J bend whereupon a cutting unit is operated to cut the strip and free the J bend element therefrom. The positioning mechanism then transports the element to a position in a fixd relationship with the header for assembly therewith. The successive operation of the strip feed, forming mechanism, cutting unit and positioning mechanism is controlled by a common drive means.

A feature of this invention is a forming mechanism which includes a pair of pins extending from the end portion of a shaft. The leading end of the strip passes between the pins and upon a rotation of the shaft, one pin revolves about the other to form a bend in the strip.

Another feature of this invention is a positioning mechanism which receives and secures the formed strip end thereby permitting a cutting unit to sever the strip a predetermined length from the bend. The positioning mechanism then rotates and descends to a lowered oriented position with respect to the header thereby permitting a pair of welding electrodes to weld the element to the header.

Other objects will be apparent and a fuller understanding of the invention may be had by referring to the following description and claims, taken in conjunction with the accompanying drawings, in which:

FIG. 2 is an enlarged fragmentary portion of the forming mechanism disclosed in FIG. 1; and FIG. 3 is an isometric view of the positioning mechanism locating the formed element over the header for connection thereto by welding electrodes.

Figure 1:
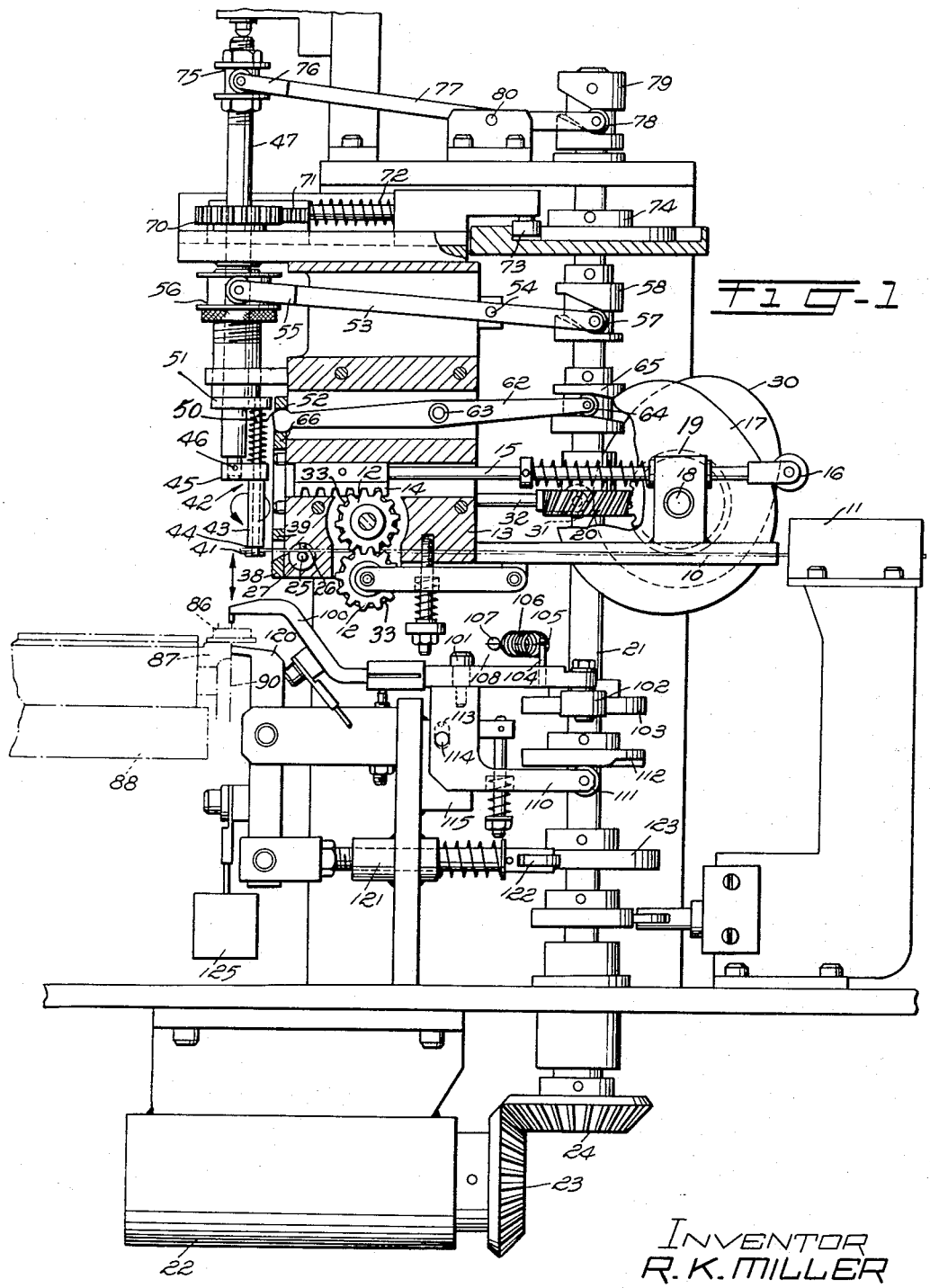
FIG. 1 is a cross-sectional side view of the apparatus embodying the invention.

Referring now to FIG. 1 of the drawing, a metallic ribbon strip 10, preferably comprised of a nickel top surface and a tin-indium bottom surface, is threaded through a ribbon straightening unit 11 and between a pair of feed rollers 33—33 which are driven by a pair of gears 12—12 disposed within a forming head 13. The rollers are in mesh and driven by a rack 14 which is connected to a spring-loaded element 15 having a cam follower 16 mounted on its far end for travel about a cam 17. Cam 17 is connected to a shaft 18 which is rotated by a gear 19 mounted thereon and in mesh with a gear 20 affixed to a main cam shaft 21 driven by a motor 22 through meshing gears 23 and 24. Thus, upon the return stroke of rack 14, that is, when it is moved to the right, the rollers rotate to feed the ribbon. It is noted at this time that upon the forward stroke of rack 14, that is, when the rack moves to he left, no ribbon is fed by the rollers due to the employment of a slip clutch unit (not shown) which prevents the feed rollers from being driven.

During the return stroke of rack 14, the ribbon is fed between two pins 25 and 26 extending from the end of a shaft 27, pin 25 being coincident with the central axis of the shaft 27 and pin 26 being movable about pin 25 upon the rotation of the shaft 27. After rack 14 completes its return stroke, the ribbon is positioned such that it extends between pins 25 and 26 (see FIG. 2). It should be noted that this description relates to the first cycle of operation during which there is no article which precedes or leads the instant article whose fabrication is being described. During subsequent cycles several operations are performed on the leading article in between the advancing and forming steps which will be described hereafter. Shaft 27 is then rotated by the action of a gear 28 affixed thereto and in mesh with a rack 29 which is driven by a cam 30 through cam follower 31 mounted on the end of a spring-loaded element 32 whose other end is connected to rack 29. Thus, during the forward stroke of rack 29, that is, when it is being moved to the left, shaft 27 rotates counterclockwise thereby causing pin 26 to move about pin 25 to form a J bend 35 in the ribbon (see FIG. 2). After the formation of J bend 35, the forward stroke of rack 29 reverses causing shaft 27 to rotate in a clockwise direction and return pin 26 to its ready forming position.

During the forming of J bend 35, feed rack 14 strokes forward, and upon the formation of the J bend, feed rack 14 commences a return stroke to actuate rollers 33—33. The rollers advance the ribbon to a point whereupon a portion of the ribbon is located between cutter blades 38 and 39 and the excessive portion 91 of the long arm 89 of the J bend is positioned between an upper jaw 40 and a lower jaw 41 of a positioning mechanism, generally referred to as 42, as seen in FIGS. 1 and 2.

The upper jaw 40 extends in a lateral direction from a bottom end 44 of a sleeve 43 towards forming head 13. The top end of the sleeve 43 is mounted in a collar 45 which extends in the opposite lateral direction and is connected to a lower portion 46 of a shaft 47. The lower jaw 41, extending in the same lateral direction as upper jaw 40, is connected to a pin 50 which extends through sleeve 43 and is attached to a collar 51 concentrically disposed about shaft 47. A lever 53, pivotally connected at 54, is provided with a roller-yoke unit 55 on one end thereof for movement within a flange member 56 which is threadedly connected to collar 51. A cam follower 57 is mounted on the other end of lever 53 for travel about a cam 58 affixed to cam shaft 21. Thus, after the excessive portion 91 of J bend 35 is positioned between jaws 40 and 41, the jaws are closed to secure said portion, the lower jaw 41 moving towards the upper jaw 40 by virtue of lever 53 lifting collar 51 and pin 50. Spring 52, disposed about pin 50 and extending between sleeve end 45 and collar 51, is compressed during this movement.

A second lever 62, pivotal at 63, has a cam follower 64 mounted on one end for travel about cam 65 and is connected at the other end to an element 66 which supports the lower movable cutter blade 38. Thus, after the excessive portion 91 of the J bend is secured within jaws 40 and 41, the movement of cam 65 causes lever 62 to pivot upwardly thereby causing lower blade 38 to move upwardly towards upper blade 39 to cut through that section of the ribbon extending therein. In so cutting, a sufficient length of the leading end of the ribbon extends between pins 25 and 26, so that upon the next forming operation, the desired length of the short arm 67 (see FIG. 2) of J bend 35 will be obtained.

A gear 70, keyed to shaft 47, is in mesh with a rack 71 which is connected to one end of a spring-loaded element 72 whose other end has a cam follower 73 mounted thereon for travel about cam 74 affixed to the main cam shaft 21. Located near the top end of shaft 47 is a flanged element 75 threadedly connected thereto for receiving a roller-yoke unit 76 connected at one end to a lever 77 whose other end has a cam follower 78 mounted thereon for travel about cam 79 affixed onto main cam shaft 21, the lever being pivotal at 80.

After the J bend element has been severed from the ribbon by cutter blades 38 and 39, rack 71 drives gear 70 causing shaft 47 to rotate counterclockwise approximately 90° to a position such that the short arm 67 of J bend 35 is oriented directly over a wafer 85 of a transistor header 86 which is secured to a jig 87 of a turret 88 (see FIGS. 1 and 3). Subsequently, lever 77 is moved downwardly about pivot 80 causing shaft 47 to descend until the long arm 89 of the J bend contacts a collector lead 90 of header 86. The shaft 47 remains in this position until the long arm 89 is welded to lead 90 by a welding operation now to be described.

As seen in FIGS. 1 and 3, a first electrode 100 is pivotally connected at 101 and has a follower 102 mounted on its end portion for travel about cam 103 affixed to cam shaft 21. A pin 104 is connected near the electrode's end portion for holding one end 105 of a spring 106 whose other end 107 is secured to an element 108. With this structure, electrode 100 is pivotally moved in a horizontal plane to and from the welding area, spring 106 being under tension when holding the electrode in the area of the transistor header 86. In this manner, a free path is provided to permit the long arm 89 of the J bend to be positioned over lead 90. An element 110 adjoined to the end portion of electrode 100 also has a follower 111 mounted thereon for travel about cam 112 affixed to shaft 21, the element having a slot 113 to provide free vertical movement about pin 114 extending from member 115 to permit movement of the electrode in a vertical plane, described in more detail hereinafter.

As seen in FIG. 1, a second electrode 120 is connected at one end to a spring-loaded lever 121 whose other end has a follower 122 mounted thereon for travel about cam 123 affixed to cam shaft 21, the movement of cam 123 causing electrode 120 to move in a horizontal plane with respect to lead 90. After the J bend is properly positioned over wafer 85 of header 86, the first electrode 100 is pivotally moved in a horizontal plane over the long arm 89 of the J bend by motion imparted thereto from cam 103. The first electrode 100 is then vertically lowered into contacting relationship with the long arm by the motion imparted thereto by cam 112. Simultaneously, the second electrode 120 is horizontally moved to the left by motion imparted thereto by cam 123 until it makes contact with lead 90. Current is supplied to the electrodes from a source 125 to weld the long arm 89 to lead 90.

After the welding operation, electrodes 100 and 120 are returned to their normal unwelding locations, and jaws 40 and 41 of the positioning mechanism 42 are opened. Positioning mechanism 42 ascends and rotates 90° counterclockwise to its normal J bend receiving position facing the forming head 13 and ready to receive a succeeding J bend therein upon the next advance of the ribbon by feed rollers 33—33. Turret 88 indexes to move header 86 to the next station whereby the excessive portion 91 of long arm 89, as seen in phantom in FIG. 3, is cut therefrom. A succeeding header is moved into the welding position ready to receive a succeeding J bend thereon. The apparatus is now ready to commence another cycle.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for forming a J bend conducting element from a length of strip material and assembling same with a transistor header, which comprises:
    means for forming an arcuately shaped bend in the leading end of the strip material;
    means for intermittently advancing the formed strip material;
    a positioning mechanism for receiving and grasping the advanced strip material a predetermined distance from the arcuately shaped bend;
    a cutting unit disposed between the forming means and positioning mechanism for cutting the strip material a predetermined length from the arcuately shaped bend to form and free a J bend element graspedly held by the positioning mechanism;
    means for moving the positioning mechanism to a fixed relationship with the header so that the respective bent end and free end of the J bend element contact said header; and
    welding means rendered effective after the J bend is freed and moved into contact with the header for joining said bent end and free end of the element to the header.

2. Apparatus according to claim 1 in which the positioning mechanism includes:
    a pair of jaws normally disposed in the path of the strip material for holding the strip the predetermined distance from the arcuately shaped bend during the cutting of the strip material; and
    means for rotating the jaws from their normally disposed position to precisely locate the bent end and the free end of the element, over the header.

3. Apparatus according to claim 2 in which the positioning mechanism further includes:
    means for lowering the jaws to locate the bent end and the free end of the element in contact with the header.

4. Apparatus according to claim 1 in which the positioning mechanism includes:
    an upper and a lower jaw normally disposed in the path of the strip material for holding the strip the predetermined distance from the arcuately shaped bend during the cutting of the strip material;
    a shaft mounted for vertical reciprocation and for rotation on its longitudinal axis;
    a collar slidably disposed around the shaft;
    a sleeve connected at one end to the upper jaw and at the other end to the shaft;
    a pin slidably mounted in the sleeve and connected at one end to the lower jaw and at the other end to the collar;
    means for advancing the collar to move the lower jaw toward and away from the upper jaw to grasp and release the element;
    means for rotating the shaft to position the grasped element over the header; and
    means for lowering the shaft and the jaws to position the element in contact with the header.

5. Apparatus according to claim 1 in which the positioning mechanism includes:
    an upper and a lower jaw normally disposed in the path of the strip material for holding the strip the predetermined distance from the arcuately shaped bend during the cutting of the strip material;

means for advancing the jaws together and apart to grasp and release the element;
means for moving the jaws through an arcuate path to position the element above the header; and
means for lowering the jaws to position the element in contact with the header, said means including a cam, and a pivotally mounted lever having a roller on each end thereof, one roller for travel about said cam, and the other for engaging and lowering said moving means.

References Cited by the Examiner

UNITED STATES PATENTS

| | | | |
|---|---|---|---|
| 1,626,652 | 5/27 | Whitmore et al. | 140—102 |
| 2,361,983 | 11/44 | Veley | 140—71 |
| 2,430,899 | 11/47 | Wallace | 153—45 |
| 2,535,328 | 12/50 | Somerville | 140—102 |
| 2,615,478 | 10/52 | Hopkes | 140—102 |
| 2,677,173 | 5/54 | Fisler | 140—71 X |
| 2,779,993 | 2/57 | Pityo | 140—71 |
| 2,960,762 | 11/60 | Sindy et al. | 29—203 |
| 2,976,895 | 3/61 | Durham | 140—102 |
| 2,980,991 | 4/61 | Frank | 29—203 |
| 2,997,904 | 8/61 | Gotsch et al. | 153—2 |
| 3,059,321 | 10/62 | Pityo | 140—93 |
| 3,086,228 | 4/63 | Mellowes | 153—2 |
| 3,095,982 | 7/63 | Weiser | 214—1 |
| 3,101,635 | 8/63 | Kulicke | 78—82 |
| 3,128,648 | 4/64 | Glagett | 78—82 |
| 3,128,649 | 4/64 | Avila et al. | 78—82 |
| 3,141,558 | 7/64 | Gubitose | 214—1 |

FOREIGN PATENTS 1,248,890  11/60  France.

CHARLES W. LANHAM, *Primary Examiner.*

RICHARD A. WAHL, *Examiner.*